United States Patent
Campbell

(10) Patent No.: US 10,375,873 B2
(45) Date of Patent: Aug. 13, 2019

(54) LANDSCAPING TOW APPARATUS

(71) Applicant: Brian Campbell, Anthony, KS (US)

(72) Inventor: Brian Campbell, Anthony, KS (US)

( * ) Notice: Subject to any disclaimer, the term of this patent is extended or adjusted under 35 U.S.C. 154(b) by 0 days.

(21) Appl. No.: 15/053,390

(22) Filed: Feb. 25, 2016

(65) Prior Publication Data
US 2016/0338256 A1 Nov. 24, 2016

Related U.S. Application Data

(60) Provisional application No. 62/162,865, filed on May 18, 2015.

(51) Int. Cl.
*A01B 49/02* (2006.01)
*A01B 63/22* (2006.01)
*A01B 63/24* (2006.01)

(52) U.S. Cl.
CPC ............ *A01B 49/027* (2013.01); *A01B 63/22* (2013.01); *A01B 63/24* (2013.01)

(58) Field of Classification Search
CPC ........ A01B 49/02; A01B 49/027; A01B 63/24
USPC ......................................................... 172/136
See application file for complete search history.

(56) References Cited

U.S. PATENT DOCUMENTS

| | | | | |
|---|---|---|---|---|
| 176,963 A | * | 5/1876 | Johnson | A01B 13/16 172/136 |
| 1,036,215 A | * | 8/1912 | Fry | A01B 61/048 172/136 |
| 1,341,231 A | * | 5/1920 | Hamilton | A01B 49/02 172/136 |
| 1,346,701 A | * | 7/1920 | Cochran | A01B 3/02 172/136 |
| 1,652,012 A | * | 12/1927 | Johnson | A01B 15/06 172/136 |
| 2,518,051 A | * | 8/1950 | Nelson | B62D 51/06 172/136 |
| 2,578,131 A | * | 12/1951 | Gannon | E02F 3/7604 172/136 |
| 3,034,238 A | * | 5/1962 | McGee | A01B 31/00 172/136 |
| 4,315,547 A | * | 2/1982 | Rau et al. | A01B 49/027 172/1 |
| 4,881,603 A | | 11/1989 | Hartman | |
| 5,078,216 A | | 1/1992 | Dick | |
| 5,094,299 A | * | 3/1992 | Freier | A01B 59/067 172/1 |

(Continued)

*Primary Examiner* — Thomas B Will
*Assistant Examiner* — Joel F. Mitchell
(74) *Attorney, Agent, or Firm* — Global Intellectual Property Agency, LLC; Daniel Boudwin

(57) ABSTRACT

A landscaping tow apparatus for cultivating dirt or land. The apparatus includes a U-shaped bracket rotatably secured to a tool head support, wherein the tool head support includes a plurality of tool heads removably secured thereon for cultivating the land. A hitch is further affixed to the U-shaped bracket and can mount the apparatus to a vehicle, such as a tractor or riding lawnmower. A pair of wheels are extendable from the bracket in order to engage the ground and lift the tool head support for rotation thereof. In operation, the hitch is secured to a tractor and the side of the tool head support having the desired tool head is positioned against the ground. The wheels are extended so that the tool head support can be rotated in order to have a different tool head engage the ground.

19 Claims, 3 Drawing Sheets

(56) References Cited

U.S. PATENT DOCUMENTS

| | | |
|---|---|---|
| 5,833,013 A | 11/1998 | Davis |
| 6,119,788 A | 9/2000 | Bernier |
| 6,286,608 B1 | 9/2001 | Fowble, III |
| 6,920,941 B2 | 7/2005 | Michel |
| 8,220,558 B2 * | 7/2012 | Davis .................. A01B 49/027 172/149 |
| 8,528,655 B1 * | 9/2013 | Sterchi ................. A01B 21/04 172/136 |

* cited by examiner

LANDSCAPING TOW APPARATUS

CROSS REFERENCE TO RELATED APPLICATION

This application claims the benefit of U.S. Provisional Application No. 62/162,865 filed on May 18, 2015. The above identified patent application is herein incorporated by reference in its entirety to provide continuity of disclosure.

BACKGROUND OF THE INVENTION

The present invention relates to tow apparatuses. More specifically, the present invention provides a tow apparatus having a plurality of tool heads attachable to a rotatable tool head support for landscaping and gardening.

When landscaping, gardening, and tilling land, many tools are required to accomplish various tasks. It is laborious and time consuming to continuously retrieve the individual tools from storage that may be located a distance away from the land to be worked upon. Further, the tools required for such tasks can be hand held or attachable to a vehicle, such as a tractor, via a tow. Having to drive a tractor any distance to have to replace a tow and tool wastes fuel and results in downtime that could be spent working on the land.

Devices have been disclosed in the prior art that relate to tow apparatuses. These include devices that have been patented and published in patent application publications. These devices generally relate to a tool head support having multiple landscaping tools attached thereto wherein the tool head support is attachable to a vehicle, such as U.S. Pat. Nos. 6,920,941, 4,881,603, 6,286,608, 5,078,216, 6,119,788, and 5,833,013.

These prior art devices have several known drawbacks. The devices in the prior art comprise grass manicuring tools that are adjustably attached to a tow in order to provide different working positions so as to treat a greater width of land with one pass. However, these devices do not comprise a tool head support that rotates and removably attaches various tool heads thereto for performing multiple landscaping and gardening tasks without having to detach the tool head support from a tow.

In light of the devices disclosed in the prior art, it is submitted that the present invention substantially diverges in design elements from the prior art and consequently it is clear that there is a need in the art for an improvement to existing tow apparatuses. In this regard the instant invention substantially fulfills these needs.

SUMMARY OF THE INVENTION

In view of the foregoing disadvantages inherent in the known types of tow apparatuses now present in the prior art, the present invention provides a new tow apparatus wherein the same can be utilized for providing convenience for the user when landscaping and gardening.

It is therefore an object of the present invention to provide a new and improved landscaping tow apparatus device that has all of the advantages of the prior art and none of the disadvantages. The apparatus comprises a U-shaped bracket rotatably secured to a tool head support, wherein the tool head support includes a plurality of tool heads removably secured thereon for cultivating the land. A hitch is further affixed to the U-shaped bracket and configured to mount the apparatus to a vehicle, such as a tractor or riding lawnmower. A pair of wheels are extendable from the bracket in order to engage the ground and lift the tool head support for rotation thereof. In operation, the hitch is secured to a tractor and the side of the tool head support having the desired tool head is positioned against the ground. The wheels are extended so the tool head support can be rotated in order to have a different tool head engage the ground.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 5:
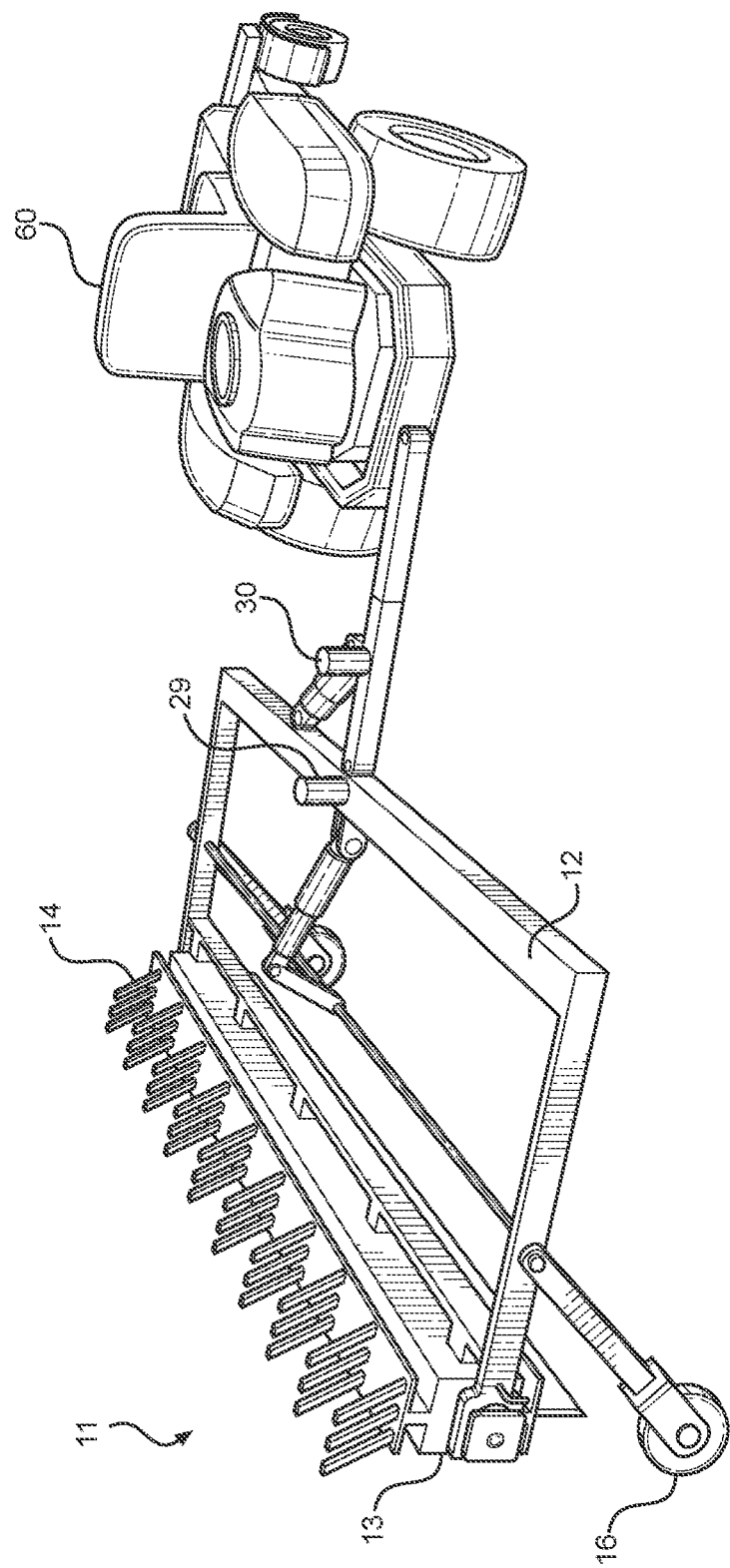

FIG. 5. shows a perspective view of an embodiment of the landscaping tow apparatus in use.

DETAILED DESCRIPTION OF THE INVENTION

Reference is made herein to the attached drawings. Like reference numerals are used throughout the drawings to depict like or similar elements of the landscaping tow apparatus. For the purposes of presenting a brief and clear description of the present invention, the preferred embodiment will be discussed as used for removably securing various tool heads to a rotatable tool head support for landscaping and gardening. The figures are intended for representative purposes only and should not be considered to be limiting in any respect.

Figure 1:
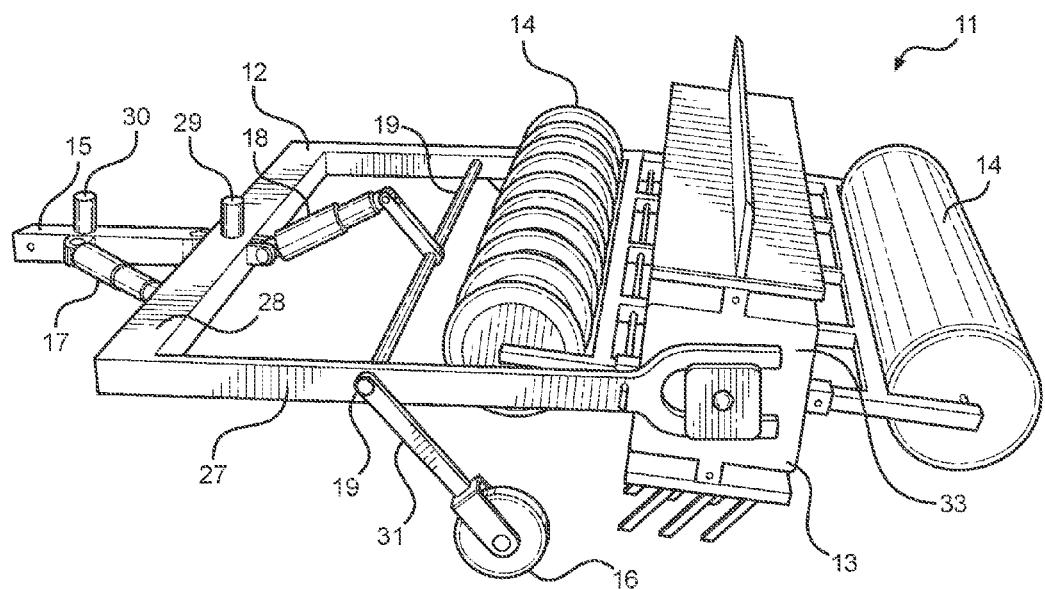
FIG. 1 shows a perspective view of the landscaping tow apparatus.
Figure 2:
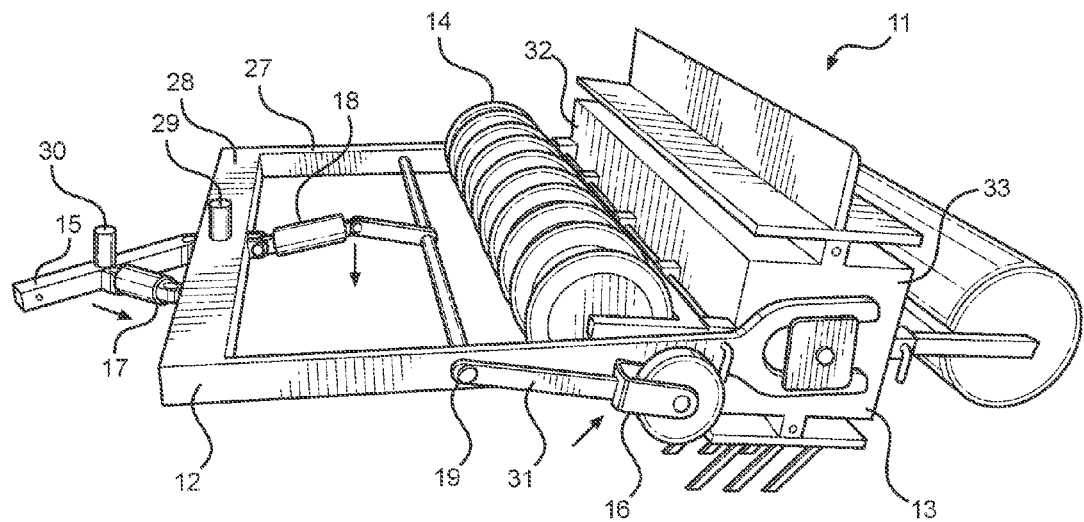
FIG. 2 shows a perspective view of the landscaping tow apparatus wherein the wheels are in a lifted position.

Referring now to FIGS. 1 and 2, there is shown perspective view of the landscaping tow apparatus and a perspective view of the landscaping tow apparatus wherein the wheels are in a lifted position. The landscaping tow apparatus 11 comprises a U-shaped bracket 12 rotatably secured to a tool head support 13, wherein the tool head support 13 comprises a plurality of tool heads 14 removably secured thereon. A hitch 15 is further affixed to the U-shaped bracket 12 and configured to mount the apparatus 11 to a vehicle, such as a tractor or riding lawnmower. In operation, the apparatus 11 is towed behind a tractor so as to allow a tool head 14 to engage the ground for landscaping and gardening purposes. The U-shaped bracket 12 includes a pair of parallel members 27 connected by a crossbar 28 extending perpendicularly therebetween. In operation, the bracket is disposed is a substantially horizontal orientation.

A pair of wheels 16 are disposed on opposing sides of the bracket 12, extending from the parallel members 27. In the illustrated embodiment, the wheels 16 are gauge wheels, however, any suitable wheels can be used. The axle of each wheel 16 is attached to a rod 31 extending upward therefrom. The wheels 16 are movable between a lowered position and a lifted position in order to adjust the height of the apparatus 11 as needed. In the lowered position, the rods 31 are perpendicular to the bracket 12 and are substantially vertical so that the wheels 16 contact the ground. In the lifted position, the rods 31 are substantially parallel to the bracket 12 so the wheels 16 do not contact the ground in order to allow a tool head 14 attached to a lower side of the tool head support 13 to contact the ground. In the illustrated embodiment, a common bar 19 extends between and through each of the parallel members 27 of the bracket 12, wherein each end of the common bar 19 is secured to an upper end of a rod 31. The common bar 19 is freely rotatable within the bracket 12, thereby allowing the wheels 16 to be raised and lowered.

In the illustrated embodiment, a first actuator 29 is secured to the U-shaped bracket 12 and allows the wheels 16 to be selectively raised and lowered. The first actuator 29 comprises a piston 18 perpendicularly attached between the crossbar 28 of the bracket 12 and the common bar 19, wherein the piston 18 is configured to rotate the common bar 19 and move the wheels 16 from a lowered to a lifted position as desired. In the lowered position, the wheels 16 are used raise the tool head support 13 and any tool head 14 attached thereto from contacting the ground. In this way, the tool head support 13 can be rotated. Further, the apparatus 11 can be transported or towed without having a tool head 14 contacting the ground when the wheels 16 are in the lowered position. In the lifted position, the wheels 16 are not engaged with the ground and, therefore, the tool head support 13 and a tool head 14 attached thereto are in contact with the ground.

In the illustrated embodiment, the hitch 15 extends outwardly from and is pivotally secured to the U-shaped bracket 12, wherein the hitch 15 is adapted to removably secure to a vehicle. Preferably, the hitch 15 comprises a rectangular member configured to mate with a conventional vehicle hitch assembly. It is not desired to limit the exact construction of the hitch 15. Preferably, the hitch 15 is attached to a central point of the crossbar 28 so as to maintain an equitable weight distribution. The hitch 15 is pivotally secured to the bracket 12 by a hinge so as to allow movement along the horizontal plane. In the illustrated embodiment, a second actuator 30 is secured to the hitch 15 and includes a piston 17 connected between the hitch 15 and the bracket 12. The second actuator 30 is operably connected to the piston 17 and configured to control the movement thereof. Further, the second actuator 30 is configured to be remotely or directly connect to a control, such as a remote control or a control integrated on a tractor. The second actuator 30 is adapted to change the angle of the hitch 15 relative to the bracket 12 as desired.

The U-shaped bracket 12 supports the tool head support 13. The tool head support 13 comprises a plurality of sides 32, a first end 33 and an opposing second end. In the illustrated embodiment, the tool head support 13 comprises a rectangular shape, having four sides 32 in order to attach a tool head 14 to each side 32. In this way, each tool head 14 attached to the support 13 is perpendicular to an adjacent tool head 14 so as not to interfere with the operation of the apparatus 11 when a tool head 14 is in contact with the ground. In some embodiments, the tool head support 13 is composed of a solid material. In alternate embodiments, the tool head support 13 comprises a hollow interior configured to be filled with liquid. When filled with liquid, the tool head support 13 is heavier in weight and adapted to provide more downward force against the ground when a tool head 14 is engaged therewith. In the alternate embodiment, the tool head support 13 further comprises an opening for receiving liquid therethrough and a cap for removably covering the opening.

Figure 3:
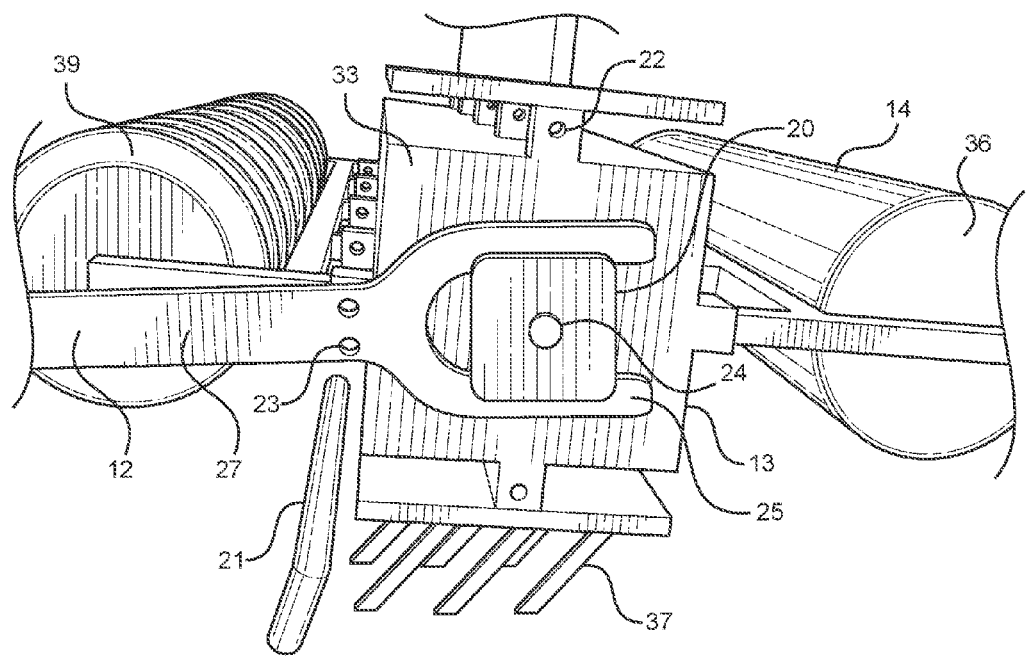
FIG. 3 shows a close-up view of the tool head support of the landscaping tow apparatus.
Figure 4:
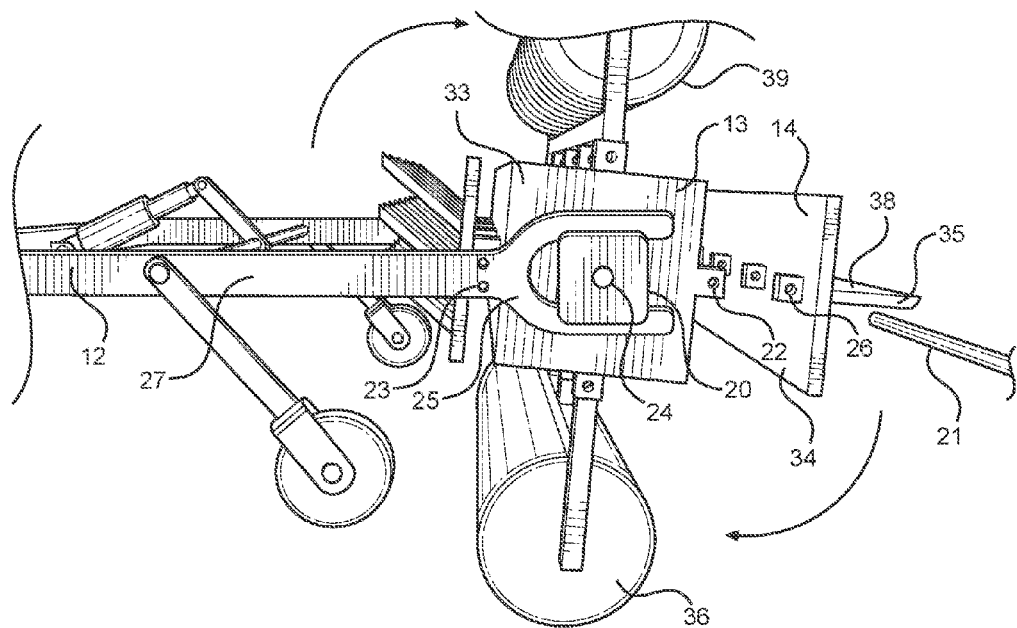
FIG. 4 shows a close-up view of a tool head detached from the tool head support of the landscaping tow apparatus.

Referring now to FIGS. 3 and 4, there is shown a close-up view of the tool head support of the landscaping tow apparatus and a close-up view of a tool head detached from the tool head support of the landscaping tow apparatus, respectively. In the illustrated embodiment, the distal ends 25 of the parallel members 28 of the bracket 12 are secured to the ends 33 of the tool head support 13 so as to allow the tool head support 13 to rotate. Each distal end 25 of the parallel members 28 comprise a slot 20 or opening, wherein a fastener 24 extends outward from each end 33 of the tool head support 13 and through the slot 20. The fastener 24 is configured to allow the tool head support 13 freely rotate as the bracket 12 remains in a fixed position. It is not desired to limit the exact construction or configuration of the manner of attachment between the bracket 12 and the tool head support 13, in which the tool head support 13 is rotatably secured to the bracket 12.

Further, the tool head support 13 comprises a plurality of tabs 22 extending outward from each side of the tool head support 13, wherein each tab 22 comprises an aperture configured to receive a locking pin 21 therethrough. The bracket 12 comprises one or more apertures 23 on the parallel members 27 adapted to align with the tabs 22 disposed on a side of the tool head support 13. Once aligned, the locking pin 21 is placed through the aperture 23 of the bracket 12 and the apertures of the tabs 22 in order to prevent the tool head support 13 from rotating.

The landscaping tow apparatus further comprises a plurality of tool heads 14 configured to cultivate land. Each side of the tool head support 13 is removably securable to a tool head 14 via a fastening mechanism. In the illustrated embodiment, the fastening mechanism utilizes the same plurality of tabs 22 extending outward from each side of the tool head support 13. Each tool head 14 comprises a rear side 34 for removably securing to a side of the tool head support 13 and a front side 35 configured to perform a task for cultivating land. The rear side 34 of the tool head 14 includes a plurality of tabs 26 that extend outward therefrom. Each tab 26 includes an aperture for receiving a locking pin 21 therethrough. The tabs 26 on the rear side 34 of the tool head 14 are configured to align with the tabs 22 on a side of the tool head support 13. Once aligned, a locking pin 21 is disposed through the apertures, thereby preventing the tool head 14 from detaching from the tool head support 13.

In the illustrated embodiment, the front side 35 of a first tool head 14 comprises a roller 36 for leveling land, wherein the roller 36 includes a cylindrical shape. The front side 35 of a second tool head 14 comprises a cultivator 37 having a plurality of tines for penetrating soil and the like. In the illustrated embodiment, the tines of the cultivator 37 are parallel to one another, however, in alternate embodiments, the tines comprise any suitable configuration for penetrating the ground and loosening the soil. The front side 35 of a third tool head 14 comprises a rake 38 configured to smooth, rake, or contour the surface of soil. The front side 35 of a fourth tool head 14 comprises a till 39 having a plurality of discs for penetrating soil and the like. In alternate embodiments, the front side 35 of a tool head 14 comprises any suitable configuration for cultivating land.

Referring now to FIG. 5, there is shown a perspective view of an embodiment of the landscaping tow apparatus in use. In operation, the hitch 15 is secured to a tractor 60 and the side of the tool head support 13 having the desired tool head 14 is positioned against the ground. The tool head support 13 is secured via the locking pins to the U-shaped bracket 12. The wheels 16 are disposed in a lifted position in order to allow the tool head 14 to contact the ground. The first and second actuator 29, 30 are adjusted so as to allow the hitch 15 and bracket 12 to be disposed in the desired position. A user tows the apparatus 11 via the tractor 60 in order to cultivate the land with the tool head 14. When a different tool head 14 is desired, the wheels 16 are lowered so as to raise the tool head support 13 and tool head 14 off the ground. The locking pin is removed from the bracket 12 and tool head support 13 so as to allow the tool head support 13 to freely rotate. A different side of the tool head support 13 having a different tool head 14 secured thereto is positioned above the ground in order to continue cultivating land without the delay of removing the tow in exchange for a different tow having a different tool secured thereto.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A landscaping tow apparatus, comprising:
    a bracket having a first end and a second end;
    a hitch pivotally affixed to the first end of the bracket;
    a tool head support rotatably mounted on the second end of the bracket;
    wherein the tool head support comprises one or more tool heads removably secured thereon;
    wherein the bracket comprises one or more apertures;
    wherein each of a plurality of sides of the tool head support comprise a plurality of tabs disposed at fixed intervals between a pair of lateral ends and extending outward therefrom;
    wherein each of the plurality of tabs includes an aperture, such that the one or more apertures of the bracket and each aperture of the plurality of tabs disposed on each of the plurality of sides of the tool head support are configured to align and receive a locking pin therethrough;
    a first set of the plurality of tabs each extending outward from a first side of the tool head support;
    a second set of the plurality of tabs each having an aperture thereon and extending outward from a first tool head of the one or more tool heads, wherein the first set and the second set are disposed at equal intervals between the pair of lateral ends of the tool head support and the pair of lateral ends of the first tool head, respectively;
    wherein the first set is configured to align with the second set such that the locking pin is adapted to be disposed through each of the aligned apertures in order to removably secure the first tool head to the tool head support;
    wherein the locking pin received therethrough extends an entire distance between the pair of lateral ends of the tool head support.

2. The landscape tow apparatus of claim 1, wherein the tool head support comprises a plurality of sides and one tool head of the one or more tool heads is removably secured to each of the plurality of sides.

3. The landscape tow apparatus of claim 1, further comprising a pair of wheels extending from opposing sides of the bracket, wherein the pair of wheels are pivotally secured to the bracket.

4. The landscape tow apparatus of claim 3, wherein the pair of wheels are operably connected to an actuator secured to the bracket that allows a user to automatically move the pair of wheels between a lowered position and a lifted position, wherein the lowered position, the pair of wheels are configured to contact the ground and in the lifted position, the pair of wheels are lifted so as to not contact the ground.

5. The landscape tow apparatus of claim 1, wherein the bracket is U-shaped having a pair of parallel members connected by a crossbar disposed therebetween, the pair of parallel members includes a first parallel and a second parallel member, wherein a distal end of the first parallel member is rotatably secured to a first end of the tool head support and a distal end of the second parallel member is rotatably secured to a second end of the tool head support.

6. The landscape tow apparatus of claim 1, wherein the tool head support is rectangular in shape and comprises four sides so as to removably receive one tool head of the one or more tool heads on each of the four sides of the tool head support.

7. The landscape tow apparatus of claim 1, further comprising an actuator having a piston secured between the hitch and the bracket, wherein the actuator is secured to the hitch and allows a user to remotely change the angle of the hitch relative to the bracket.

8. The landscape tow apparatus of claim 1, wherein each of the tool heads includes a rear side and a front side, wherein the rear side is removably secured to a side of the tool head support and the front side is configured to cultivate the land.

9. The landscape tow apparatus of claim 8, wherein the front side comprises a till.

10. The landscape tow apparatus of claim 8, wherein the front side comprises a roller.

11. The landscape tow apparatus of claim 8, wherein the front side comprises a rake.

12. The landscape tow apparatus of claim 8, wherein the front side comprises a cultivator.

13. The landscape tow apparatus of claim 5, wherein the distal ends of each of the pair of parallel members comprise a Y-shaped fork defining a gap, the gap dimensioned to receive an end of the tool head support therein.

14. The landscape tow apparatus of claim 7, wherein actuation of the actuator is configured to cause simultaneous change to the angle of the hitch relative to the bracket.

15. A landscaping tow apparatus, comprising:
    a bracket having a first end and a second end;
    a tool head support rotatably mounted on the second end of the bracket;
    wherein the bracket is U-shaped having a pair of parallel members connected by a crossbar disposed therebetween, the pair of parallel members includes a first parallel member and a second parallel member;
    wherein a distal end of the first parallel member is rotatably secured to a first end of the tool head support and a distal end of the second parallel member is rotatably secured to a second end of the tool head support;

wherein the distal ends of each of the pair of parallel members comprise a Y-shaped fork defining a gap, the gap dimensioned to receive an end of the tool head support therein;

a hitch pivotally affixed to the first end of the bracket;

wherein the tool head support comprises one or more tool heads removably secured thereon;

wherein the bracket comprises one or more apertures;

wherein each of a plurality of sides of the tool head support comprise a plurality of tabs disposed at fixed intervals between a pair of lateral ends and extending outward therefrom;

wherein each of the plurality of tabs includes an aperture, such that the one or more apertures of the bracket and each aperture of the plurality of tabs disposed on each of the plurality of sides of the tool head support are configured to align and receive a locking pin therethrough;

wherein the locking pin received therethrough extends an entire distance between the pair of lateral ends of the tool head support.

16. The landscape tow apparatus of claim 15, wherein the tool head support comprises a plurality of sides and one tool head of the one or more tool heads is removably secured to each of the plurality of sides.

17. The landscape tow apparatus of claim 15, further comprising a pair of wheels extending from opposing sides of the bracket, wherein the pair of wheels are pivotally secured to the bracket.

18. The landscape tow apparatus of claim 17, wherein the pair of wheels are operably connected to an actuator secured to the bracket that allows a user to automatically move the pair of wheels between a lowered position and a lifted position, wherein the lowered position, the pair of wheels are configured to contact the ground and in the lifted position, the pair of wheels are lifted so as to not contact the ground.

19. The landscape tow apparatus of claim 15, further comprising an actuator having a piston secured between the hitch and the bracket, wherein the actuator is secured to the hitch and allows a user to remotely change the angle of the hitch relative to the bracket.

* * * * *